United States Patent [19]

Lachman et al.

[11] Patent Number: 4,800,187

[45] Date of Patent: Jan. 24, 1989

[54] METHOD OF CRYSTALLIZING A ZEOLITE ON THE SURFACE OF A MONOLITHIC CERAMIC SUBSTRATE

[75] Inventors: Irwin M. Lachman; Mallanagouda D. Patil, both of Corning, N.Y.

[73] Assignee: Corning Glass Works, Corning, N.Y.

[21] Appl. No.: 113,475

[22] Filed: Oct. 28, 1987

[51] Int. Cl.⁴ .............................................. B01J 29/06
[52] U.S. Cl. ..................................... 502/64; 502/60; 502/68
[58] Field of Search ...................... 502/60, 64, 68, 69; 423/328

[56] References Cited

U.S. PATENT DOCUMENTS

| | | | |
|---|---|---|---|
| 3,244,643 | 4/1966 | Schwartz | 502/64 |
| 3,406,124 | 10/1965 | Eastwood et al. | 252/455 |
| 3,468,815 | 9/1969 | Cole et al. | 502/64 |
| 3,518,206 | 6/1970 | Sowards et al. | 502/64 |
| 3,523,092 | 8/1970 | Kearby | 502/64 |
| 3,730,910 | 5/1973 | Albers et al. | 252/455 |
| 3,795,631 | 3/1974 | Heinze et al. | 502/64 |
| 3,958,058 | 5/1976 | Elmer | 428/220 |
| 4,157,375 | 6/1979 | Brown et al. | 423/239 |

*Primary Examiner*—Carl F. Dees
*Attorney, Agent, or Firm*—Charles Q. Buckwalter; Gary H. Levin; Richard N. Wardell

[57] ABSTRACT

A method is provided of crystallizing strong-bound zeolites on the surfaces of a monolithic ceramic substrate by hydrothermally treating the substrate, in the presence of active silica, with a caustic bath to zeolitize the silica. According to various embodiments of the invention, the active silica can be present as a component of the caustic bath, in the form of a dried coating pre-deposited on the substrate, or as a separate phase of the monolithic substrate, homogeneous dispersed within the ceramic material.

29 Claims, No Drawings

METHOD OF CRYSTALLIZING A ZEOLITE ON THE SURFACE OF A MONOLITHIC CERAMIC SUBSTRATE

This invention is directed to the in situ crystallization of zeolites on ceramic substrates, and more particularly to preparation of monolithic ceramic honeycomb substrates having strongly-bound zeolite crystals on the surfaces of the honeycomb.

Synthetic molecular sieve zeolites are used in myriad catalytic applications, for example, by the petroleum and chemical industry in the catalytic cracking or thermo-forming operations and various heterogeneous chemical processes, by the soft-drink industry in the carbonization of soft drinks, and by both automotive and power industries to abate $NO_x$ or other harmful emissions. In these applications, the zeolite-based catalysts have taken many forms which, though serviceable, all have disadvantages, either in use or in their own production.

Many catalytic operations employ a "bed" of particulate catalyst through which the work stream passes. For this kind of operation, synthetic zeolites have been crystallized directly into powdery or micro-pellet form, or pre-formed zeolites have been embedded in or coated on porous ceramic pellets or beads. Such pelletized catalysts, however, although presenting high catalytic surface area to the work stream, also provide high resistance to flow, resulting in substantial pressure drop. For other operations, in which high pressure drop can not be tolerated, zeolites have been embedded in or coated on monolithic ceramic structures, such as extruded honeycombs. Pre-formed zeolites that are coated onto a ceramic substrate by traditional "wash coat" procedures, however, suffer from several disadvantages. In service, structures can be exposed to work streams which often contain dust or particulate matter, which can cause the zeolitic coating to flake off the underlying ceramic support. Such abrading of the zeolite decreases the catalytic efficiency and ultimately makes necessary the re-coating or complete replacement of the monolith.

Monolithic structures containing zeolites less susceptible to abrasion have been made by extruding pre-formed zeolites together with a porous ceramic material providing a substrate in which the zeolite is embedded within the ceramic matrix. See, for example, U.S. Pat. No. 4,007,134, in which a honeycomb catalyst containing up to 40% by weight zeolite is prepared by extruding and firing a mixture of pre-formed zeolite crystals with a ceramic binder, such as clay. This method, however, requires that the strength of the underlying ceramic structure be sacrificed. Because of the well-known thermal instability of zeolite crystals, the extruded ceramic mass incorporating them cannot be sintered at the high temperatures, generally above about 750° C., otherwise required to densify and strengthen many ceramic materials.

To avoid this problem, the subsequent in situ formation of zeolites within pre-sintered ceramic structures has also been performed. See, for example, U.S. Pat. No. 4,157,375, in which a honeycomb preform of kaolin clay is zeolitized by hydrothermal treatment in a caustic bath to convert 29% by weight of the preform into ZSM-5 zeolite. Zeolite crystals, however, do not have the structural strength associated with the ceramic materials which normally form the monolithic honeycombs, and the generation of a zeolitic sub-matrix within the pre-existing crystalline lattice of the ceramic can weaken the structure.

Accordingly, there remains a need for a monolithic ceramic substrate having a strongly-bound coating of zeolitic material on its surface, and preferably throughout its porous structure thus providing a structurally strong underlying ceramic material and an abrasion-resistant coating of zeolitic material to provide a catalytic surface that is readily contacted by the work stream.

SUMMARY OF THE INVENTION

The present invention provides a method of crystallizing strongly-bound zeolites on the surfaces of a monolithic ceramic substrate, such as a honeycomb, by hydrothermally treating the substrate, in the presence of active silica, with a caustic bath to crystallize the silica to a zeolite form.

According to a first embodiment of the invention, a monolithic ceramic substrate having an oxide composition consisting essentially of 45–75% by weight silica, 8–45% by weight alumina, and 7–20% by weight magnesia is hydrothermally treated with an aqueous solution comprising sodium oxide or hydroxide, alumina, and optionally active silica at a temperature and for a time sufficient to crystallize a desired zeolite on the surfaces of the substrate. In a second embodiment, a monolithic ceramic substrate is coated with a layer of active silica, the coating being 1–45% of the weight of the coated substrate, and then hydrothermally treated with an aqueous solution comprising sodium oxide or hydroxide and alumina to crystallize the active silica to the desired zeolite and provide the zeolite on the surfaces of the substrate. In a third embodiment, a sintered monolithic body, which comprises a porous ceramic material and 1–40% by weight, based on the total body weight, of active silica embedded within the ceramic material, is hydrothermally treated with an aqueous solution comprising sodium oxide or hydroxide and optionally alumina to crystallize a desired zeolite on the surface of the body.

In preferred versions of the invention, the ceramic material of the monolith is cordierite, and the monolith is in the form of a thin-walled honeycomb having at least 4 channels per square inch of frontal surface area. In particularly preferred versions of the second and third embodiments, zeolite seed crystals are incorporated into the coating (second embodiment) or into the pre-formed monolith (third embodiment) with the active silica. The use of such seed crystals provides zeolite with high purity and eliminates the need to use organic templating agents, which are expensive and toxic, to provide nucleation sites for certain of the zeolites, notably ZSM-5 zeolite (also known as "silicalite"). Accordingly, the present invention provides a safer and less expensive method to grow strongly-bound zeolites on the surfaces of monolithic ceramic substrates.

DETAILED DESCRIPTION OF THE INVENTION

The present invention provides a method for the in situ growth of zeolites on the surfaces of a monolithic ceramic substrate. In general terms, the invention comprises hydrothermally treating the ceramic substrate, in the presence of active silica, in a caustic bath to crystallize a desired zeolite on the surfaces of the substrate. The ceramic materials of the monolith are generally porous, and as used herein, "surfaces" refers to those surfaces of the monolith substrate, including surfaces forming the pore cavities, which are normally intended to be in contact with the work stream of material to be catalyzed. Various embodiments of the invention differ in the manner in which the active silica is incorporated into the system.

According to a first embodiment (hereinafter, embodiment "A"), the ceramic substrate has a silica-rich phase inherent in its crystal structure, which phase functions as the active silica. In an optional version of this embodiment, additional active silica can be introduced as a component of the caustic treatment solution. In this embodiment, a monolithic ceramic substrate having an oxide composition consisting essentially of 45–75% by weight silica, 8–45% by weight alumina, and 7–20% by weight magnesia is hydrothermally treated with an aqueous solution comprising sodium oxide or hydroxide, alumina, and optionally active silica to form crystals of a desired zeolite on the surfaces of the substrate.

According to another embodiment of the invention (hereinafter embodiment "B"), the silica is provided in the form of a coating to the substrate. In this embodiment, a monolithic ceramic substrate is coated with a layer of active silica and thereafter is hydrothermally treated with an aqueous solution comprising sodium oxide or hydroxide and alumina to form the desired zeolite on the surfaces of the substrate.

According to a third embodiment (hereinafter, embodiment "C"), the active silica is dispersed throughout and embedded within the ceramic material of the monolith. In this embodiment, active silica and ceramic material are admixed and co-processed to provide a sintered monolithic body which comprises a porous ceramic material and 1–40% by weight, based on the total weight of the body, of active silica. The monolithic body is hydrothermally treated with an aqueous solution comprising sodium oxide or hydroxide and optionally alumina to form crystals of the desired zeolite on the body's surfaces.

Each of these embodiments is described in greater detail below.

The present invention incorporates principals of zeolite production which are known in the art, but which have not heretofore been used to produce zeolitic material in situ on the surfaces of monolithic ceramic substrates in the manner here described. It is known, for example, that particular zeolites, the sodium-aluminosilicates, can be crystallized and precipitated from aqueous caustic precursor solutions containing their constituent oxides, silica and alumina. The particular composition of the precursor solution is dependent on the particular zeolite desired. These known precursor solutions form the basis for the hydrothermal treatment solutions of the present invention, and those corresponding to the most preferred zeolites according to the present invention are shown in Table I below. Other zeolites, such as other ZSM-series sodium-aluminosilicates, can also be crystallized, and are contemplated for in situ production in this invention, by known adjustment to the solution composition.

TABLE I

| Zeolite | Molar Ratio of Constituents | | | |
| --- | --- | --- | --- | --- |
| | $SiO_2$ | $Al_2O_3$ | $Na_2O$ | $H_2O$ |
| X-Type | 1 | 0.2–0.5 | 1.2–1.5 | 40–60 |
| Y-Type | 1 | 0.04–0.14 | 0.4–0.6 | 16–24 |
| Mordenite | 1 | 0.04–0.09 | 0.11–0.15 | 20–25 |

TABLE I-continued

| Zeolite | Molar Ratio of Constituents | | | |
| --- | --- | --- | --- | --- |
| | $SiO_2$ | $Al_2O_3$ | $Na_2O$ | $H_2O$ |
| ZSM-5 | 1 | 0.0–0.04 | 0.2–0.75 | 16–20 |

The hydrothermal treatment solution used according to the present invention to crystallize a particular zeolite on the ceramic substrate will have a composition and concentration as shown in Table I or a modification thereof corresponding to the particular zeolite to be crystallized. In embodiment A of the invention, the ceramic substrate inherently has a high silica content in its crystalline lattice, which silica functions as the active silica. In embodiments B and C of the invention, the active silica is pre-associated with the ceramic substrate, as described above, prior to hydrothermal treatment, and is therefore not of necessity present in the solution itself. In those embodiments, the treatment solution need not contain silica but has all other ingredients in the same proportions, relative to each other and to the amount of pre-associated active silica. Nevertheless, in optional versions of these embodiments, additional active silica can be in the solution as well, providing the desirable effects.

The conditions of hydrothermal treatment according to the invention will vary according to the zeolite to be crystallized. Generally, crystallization of the X-type and Y-type zeolites on the ceramic surface requires that the ceramic be in contact with the treatment solution for about 10–110 hours at a temperature of about 90°–100° C. Production of mordenite or ZSM-5 zeolites takes place upon treatment for about 45–75 hours at a temperature of about 140°–175° C., with the treatment preferably taking place in an enclosed bomb at autogenous pressure. In addition, the nucleation of mordenite or ZSM-5 zeolites can be facilitated by the presence of an organic templating agent, such as a tetra-alkylammonium bromide, in the treatment solution. The templating agent is used in an amount of about 0.3–0.6 mole of agent per mole of active silica used in the method. A preferred templating agent is tetra-propyl ammonium bromide (TPA-Br).

The "active silica" of this invention is silica which, after calcining, has a surface area of at least 25 $m^2/g$, preferably at least 100 $m^2/g$. The silica generally has a pre-calcining surface area of at least about 200 $m^2/g$. (As used herein, "calcining" means heating a material to a temperature sufficiently high to substantially eliminate any volatiles but below that at which the material begins to lose substantial porosity and surface area.) Examples are the silicas of about 1–10 microns or submicron particle size, such as CABOSIL EH-5 colloidal silica (an amorphous silica having a pre-calcining surface area of about 400 $m^2/g$ and a medium crystalline size of about 0.007 micron) available from Cabot Corporation, QUSO G-761 silica (a hydrophilic silica having a mean crystallite size of about 0.015 micron) available from PQ Corporation, and LUDOX-HS colloidal silica available from E.I. du Pont de Nemours & Company. Colloidal silica derived from gels can also be used, examples of which are Grace-81 silica gel (600 $m^2/g$ surface area) available from the Davison Chemical Division of W.R. Grace and Company. Active silica precursors, which generate the active silica itself upon firing, can also be used, particularly in embodiment C. Examples are silicone resins such as those disclosed in U.S.

Pat. No. 3,090,681 issued to Weyer. The most preferred silicon resin is a hydroxyl functional silicone resin available from the Dow-Corning Company as resin QC-2230.

With particular reference to embodiment A of the invention, the monolithic ceramic substrate on which the zeolites are to be grown has a silica-rich oxide composition consisting essentially of 45-75% by weight silica, 8-45% by weight alumina, and 7-20% by weight magnesia. The silica of this oxide composition is bound in the crystalline ceramic lattice, and in the conduct of this invention, is crystallized to zeolite form during the hydrothermal treatment. It has also been found that the silica from this phase can react with any active silica present in the hydrothermal treatment solution of this embodiment so that zeolites which crystallize from that source of silica are strongly bound to the ceramic surface.

The monolithic ceramic of this embodiment can be prepared by directly mixing, extruding, and firing/sintering in conventional manner a composition of the component oxides, or oxide precursors as explained in U.S. Pat. No. 3,885,997. However a preferred source of a pre-formed ceramic structure of such composition is a standard cordierite monolith from which magnesium and aluminum species have been selectively leached, leaving a silica-rich phase. Standard crystalline cordierite has an oxide composition, by weight, of about 51% silica, 35% alumina, and 14% magnesia. By contacting a cordierite monolith with a strong (e.g. 1-5 normal) mineral acid for about 0.25-20 hours, the aluminum and magnesium species can be selectively leached from the monolith, for a total weight loss of about 4-32%, to produce the silica-rich oxide composition described above. The procedure for acid-leaching a crystalline cordierite article is described in more detail in U.S. Pat. No. 3,958,058 (issued May 18, 1976, to Elmer), which is incorporated by reference herein. Embodiment A can also be applied to glass or glass-ceramic substrates which are acid-leached according to the above described conditions.

Further according to embodiment A of this invention, the ceramic monolith is hydrothermally treated, as described above in connection with Table I, with an aqueous solution of alumina, sodium oxide (or sodium hydroxide), and optionally additional active silica and/or templating agent. After crystallization of the zeolite, the monolith is washed with hot distilled water to remove soluble materials, such as base or organics, and is then dried, typically at about 100° C. for 16-24 hours.

With particular reference to embodiment B of this invention, the monolithic ceramic substrate on which zeolite is to be crystallized can be composed of any porous ceramic, porous metal, or glass-ceramic material. Examples are cordierite, mullite, zircon, fused quartz, fused silica, spinel, feldspar, titania, alumina, zirconia, lithium aluminosilicates and kaolin clay. Preferred are those materials which contain silica, and more preferred are those which contain both silica and alumina. The most preferred ceramic material is cordierite, and the most preferred monolith for use in this embodiment is a cordierite monolith which has been acid-leached as described above.

According to this embodiment B, a sintered ceramic substrate is coated with active silica prior to the hydrothermal treatment. This coating can be applied by any of the conventional techniques by which high surface area oxides or catalytic metal oxides have been coated on ceramic substrates in the past. In a preferred application, the active silica and a silica-based bonding agent, such as Silbond H-5 prehydrolyzed ethylorthosilicate solution (Stauffer Chemical Company), are dispersed in water, an organic solvent, or a mixture thereof to form a slurry, which is then applied to the ceramic substrate by spray-coating or dip-coating. The slurry is preferably applied in several layers, with each layer permitted to air-dry prior to application of the succeeding layer. After the final layer is applied, the coated substrate is dried at 90°-100° C. for 18-24 hours, and then fired at 350°-550° C. for about 3-10 hours to drive off any organic material. Sufficient active silica material should be applied to the substrate in this manner to provide a dried coating of active silica weighing 1-45%, preferably 15-30%, of the weight of the coated substrate.

Optionally, 1-15% by weight, preferably 5-10% by weight based on the weight of the active silica, of preformed crystals of the desired zeolite can be added to the coating to "seed" the further zeolite growth. The seed crystals are incorporated into the coating by mixing the crystals with the active silica and bonding agent in the slurry. The presence of the seed provides nucleation sites for zeolite growth, and eliminates the need to use templating agent for the production of the ZSM-series and mordenite zeolites. For example, mordenite zeolite often fails to crystallize to any substantial degree unless templating agent or, preferably, seed is present. The presence of seed is further preferred to provide the desired zeolite in purer form. It has been found that in the absence of the associated seeds, the growth of X-type or Y-type zeolites on the coated substrates is often accompanied by crystalline impurities (such as Na-A zeolite and/or sodalite).

Hydrothermal treatment according to embodiment B is conducted as described earlier. The coated monolith is immersed in an aqueous solution of alumina, sodium oxide (or sodium hydroxide), and optionally templating agent at a temperature and for a time sufficient to crystallize the desired zeolite. Additional active silica can also be present in the solution. After crystallization, the monolith is washed with hot distilled water and is then dried at about 100° C. for 16-24 hours.

With particular reference to embodiment C of the invention, the monolithic ceramic substrate on which zeolite is to be crystallized contains active silica dispersed throughout and embedded within the ceramic material itself, which material forms a matrix in which the active silica is embedded. The ceramic can be any metal, sinterable ceramic, or glass-ceramic material. Examples of such materials are cordierite (preferably pre-reacted cordierite), mullite, lithiumaluminosilicates, zircon, silica carbide, silica nitride, other carbides, nitrides, and silcides, quartz, feldspar, fused silica, kaolin clay, metals of the kind disclosed in U.S. application Ser. No. 54,845, filed May 27, 1987 now U.S. Pat. No. 4,758,272 (which is herein incorporated by reference as filed), and mixtures thereof. Preferred are those ceramic materials which contain one or both of silica and alumina in the crystalline lattice. Most preferred is cordierite.

The substrate, containing the active silica, can be prepared by conventional techniques. The sinterable ceramic matrix material, and active silica in an amount of 1-40% by weight, preferably 10-30% by weight, based on the total ceramic plus silica weight, are admixed into a substantially homogeneous body. The ceramic material is preferably in particulate form of a size finer than 200 mesh (U.S. standard). Optionally a temporary binder is admixed with the other components as well, which binder can be any of those commonly used in ceramic catalyst support manufacture. The preferred binder is methyl cellulose, an example of which is Methocel ® A4M from the Dow Chemical Company. Up to about 3% by weight, based upon total mixture weight, of a surfactant, such as sodium stearate, can also be used to facilitate mixing and flow for subsequent processing. Normally, the dry ingredients are first premixed dry and then combined with any wet ingredients. Conventional equipment is used to form a homogeneous or substantially homogeneous mixture. Ultimately, the batch mix is formed into the desired shape of the monolithic support, preferably by extrusion through a die or injection molding. (The preferred shape for this embodiment, as well as for the pre-formed monoliths of embodiments A and B, is that of a thin-walled honeycomb having at least 4, more preferably at least 100, and most preferably at least 200, through-and-through channels per square inch of frontal surface area and a wall thickness of about 3-250 mils.) Finally, the shaped monolith is heated to a temperature and for a time sufficient to sinter the ceramic material. Generally, the shape is dried at about 100°-120° C., and then fired/sintered at 500°-850° C. for 1-12 hours.

In Embodiment C, optionally about 5-80% by weight, based on the weight of the active silica, of pre-formed crystals of the desired zeolite can be incorporated into the monolith to "seed" the further zeolite growth. The seed crystals are admixed with the other components during the formation of the monolith. As in embodiment B, the presence of the seed provides nucleation sites for zeolite growth, and permits growth of certain of the zeolites to proceed without the use of organic templating agent. For example, the ZSM-5, mordenite, and Y-type zeolites might fail to crystallize to any substantial degree in embodiment C unless either templating agent or seed is present. The presence of seed further provides zeolites, particularly the ZSM-5 and mordenite zeolites, with little or no crystalline impurity.

According to the hydrothermal treatment of embodiment C, the monolith is immersed in an aqueous solution of sodium oxide (or sodium hydroxide), and optionally alumina and templating agent, at a temperature and for a time sufficient to crystallize the desired zeolite. Because of the extent to which the active silica is dispersed throughout the ceramic material, zeolites will be crystallized within the ceramic structure itself as well as on the surfaces of the material. Additional active silica can also be present in the solution. Alumina need not be present in the treatment solution for the production of zeolites, which have low alumina contents, such as ZSM-5 zeolites, when the ceramic material itself contains alumina in its crystalline structure. Following the hydrothermal treatment, the monolith is washed with hot distilled water and is then dried at about 100° C. for 16-24 hours.

Various combinations of the Embodiments A, B, and C, can also be used. For example, a coating of active silica, as described in Embodiment B, can be applied to the sintered ceramic substrate of Embodiment A prior to the leaching procedure, during which the substrate is contacted with a strong mineral acid. Similarly, a coating of active silica can be applied to the sintered monolithic substrate of Embodiment C, which substrate, as described above, has active silica dispersed throughout its interior as well. Such combinations of the described embodiments provide abundant active silica for the in situ growth of zeolites.

The above-described embodiments of this invention provide monolithic ceramic substrates having essentially pure zeolites strongly bound to the surfaces of the substrate. The zeolites are not easily abraded, and the monolith itself provides a strong and thermally stable underlying support that is particularly well suited for catalytic applications in which physical or thermal shock will be encountered.

The following examples are illustrative, but not limiting, of the invention.

EXAMPLE 1

A series of standard Celcor ® cordierite honeycomb monoliths (Corning Glass Works) were acid-leached in 1.5N HNO$_3$ solution at 95° C. for 6 hours. Leaching of the specimens was followed by washing for 10 minutes in 0.15N HNO$_3$ (95° C.), further washing for 10 minutes in distilled water (95° C.), and drying at 100° C. for 16-20 hours.

The leached monoliths were then immersed in various hydrothermal treatment solutions to crystallize zeolites on the surfaces at different conditions of temperature, pressure, and time. For X- and Y- zeolites, crystallization was conducted in 165-ml Pyrex culture tubes in a 95° C. water bath at atmospheric pressure. Mordenite and ZSM-5 zeolites were crystallized in 125-ml teflon cups enclosed in a steel digestion bomb at autogenous pressure. The exact compositions of the treatment solutions used and the treatment conditions are shown in Table 1. After crystallization, the monoliths were washed with hot distilled water, dried at 100° C. for 16-24 hours, and characterized by x-ray diffraction (XRD). The phases found by XRD are also listed in Table 1.

TABLE 1

| Ex. | Treatment Conditions (°C./hr.) | Treatment Solution Composition (in grams) | | | | | | | XRD-Identified Phases |
|---|---|---|---|---|---|---|---|---|---|
| | | Silica gel (Grace-81) | Colloidal Silica (Ludox-HS) | Silica S-35 | Alumina (Hydral-710) | NaOH | TPA-Br | H$_2$O | |
| A | 95/70 | 6.94 | — | — | 6.05 | 11.1 | — | 100 | X-zeolite, cordierite, A-zeolite impurity |
| B | 95/70 | 6.94 | — | — | 6.05 | 11.1 | — | 100 | X-zeolite, cordierite, A-zeolite impurity |
| C | 95/67 | 6.94 | — | — | 6.05 | 11.1 | — | 100 | X-zeolite, cordierite, A-zeolite impurity |
| D | 95/70 | 6.94 | — | — | 6.05 | 11.1 | — | 100 | X-zeolite, cordierite, A-zeolite impurity |
| E | 95/114 | 20.8 | — | — | 2.72 | 11.1 | — | 100 | Y-zeolite, cordierite, A-zeolite impurity |
| F | 95/96 | — | — | 82.2 | 2.72 | 4.0 | — | 45 | Y-zeolite, cordierite, A-zeolite impurity |

TABLE 1-continued

| Ex. | Treatment Conditions (°C./hr.) | Treatment Solution Composition (in grams) | | | | | | | XRD-Identified Phases |
|---|---|---|---|---|---|---|---|---|---|
| | | Silica gel (Grace-81) | Colloidal Silica (Ludox-HS) | Silica S-35 | Alumina (Hydral-710) | NaOH | TPA-Br | $H_2O$ | |
| G | 95/96 | — | — | 82.2 | 2.72 | 4.0 | — | 45 | Y-zeolite, cordierite, A-zeolite impurity |
| H | 170/72 | 5.56 | — | — | 0.14 | 1.15 | 8.06 | 79.8 | ZSM-5, cordierite |
| I | 150/72 | 7.28 | — | — | 0.19 | 1.53 | 10.75 | 106.4 | ZSM-5, cordierite |
| J | 150/72 | 7.28 | — | — | 0.19 | 1.53 | 10.75 | 106.4 | ZSM-5, cordierite |
| K | 170/70 | — | 13.65 | — | 0.14 | 1.15 | 8.06 | 71.06 | ZSM-5, cordierite |
| L | 170/72 | — | — | — | 0.14 | 1.15 | 8.06 | 71.06 | ZSM-5, cordierite |
| M | 170/64 | — | 12 | — | 0.10 | 1.05 | 7.38 | 73.0 | ZSM-5, cordierite |
| N | 165/91 | — | 12 | — | 0.10 | 1.05 | 7.38 | 73.0 | ZSM-5, cordierite |
| O | 165/91 | — | 12 | — | 0.10 | 1.05 | 7.38 | 73.0 | ZSM-5, cordierite |

EXAMPLE 2

A second series of Celcor ® cordierite honeycomb monoliths were acid-leached and processed as described in Example 1. Additional Celcor ® cordierite honeycombs were used unleached. Coating slurries of 40 weight parts of Grace-81 silica gel, either "as received" (200 particle size) or "ball-milled" (about 7μ particle size), and 150 weight parts of Silbond H-5 prehydrolyzed ethyl-orthosilicate solution were prepared by combining the ingredients and mixing for 10-15 minutes. The honeycombs were dipped into one or the other of the slurries and then removed. The channels of the honeycombs were cleared with compressed air, and the honeycombs allowed to dry in air for 30-40 minutes. This coating/drying procedure was repeated 3-4 times for each honeycomb to achieve high silica loading. The coated honeycombs were then oven dried for 24 hours at 100° C., followed by firing at 500° C. for four hours. In each case, a dried coating of active silica weighing 20-40% of the weight of the original uncoated honeycomb was achieved.

The coated honeycombs were then immersed in various hydrothermal treatment solutions to crystallize zeolites on the honeycomb surfaces at different conditions of temperature, pressure, and time. The experimental equipment used for the crystallization was as described for Example 1. The exact weight of silica coated on the honeycomb, the exact compositions of the treatment solutions used, and the experimental conditions are shown in Table 2. After crystallization, the monoliths were washed with hot distilled water, dried at 100° C. for 24 hours, and characterized by XRD.

TABLE 2

| Ex. | Honeycomb | Treatment Conditions (°C./hrs.) | Weight of Coated Silica (g)* | Treatment Solution Composition (in grams) | | | | XRD-Identified Phases |
|---|---|---|---|---|---|---|---|---|
| | | | | NaOH | Alumina (Hydral-710) | $H_2O$ | TPA-Br | |
| A | Unleached | 95/50 | 5.35$^a$ | 3.3 | 0.82 | 30 | — | Cordierite, minor Y-zeolite |
| B | Unleached | 95/50 | 3.76$^a$ | 2.8 | 0.7 | 25 | — | Cordierite, minor Y-zeolite |
| C | Unleached | 95/50 | 4.3$^a$ | 2.8 | 0.7 | 25 | — | Cordierite, minor Y-zeolite |
| D | Leached | 95/50 | 5.01$^a$ | 4.4 | 1.1 | 40 | — | Cordierite, minor Y-zeolite, sodalite impurity |
| E | Leached | 95/50 | 3.7$^a$ | 4.4 | 1.1 | 40 | — | Cordierite, minor Y-zeolite, sodalite impurity |
| F | Unleached | 95/50 | 2.81$^a$ | 4.4 | 1.1 | 40 | — | Cordierite, minor Y-zeolite, sodalite impurity |
| G | Leached | 95/100 | 3.9$^b$ | 2.22 | 0.55 | 24 | — | Cordierite + amorphous silica, no crystallization |
| H | Leached | 95/100 | 3.9$^b$ | 2.22 | 0.55 | 23 | — | Cordierite + amorphous silica, no crystallization |
| I | Leached | 165/56 | 8.4$^a$ | 3.43 | 1.97 | 50 | — | Cordierite, sodalite impurity, no mordenite |
| J | Leached | 95/120 | 3.5$^b$ | 5.55 | 3.02 | 50 | — | Cordierite, X-zeolite, Na-A zeolite |
| K | Leached | 95/120 | 3.6$^a$ | 5.55 | 3.20 | 50 | — | Cordierite, X-zeolite, Na-A zeolite |
| L | Leached | 170/73 | 4.04$^b$ | 0.84 | 0.10 | 58.5 | 5.90 | ZSM-5, Cordierite, little or no crystalline impurity |
| M | Leached | 170/73 | 3.78$^b$ | 0.84 | 0.10 | 58.5 | 5.90 | ZSM-5, Cordierite, little or no crystalline impurity |
| N | Leached | 170/72 | 4.0$^b$ | 0.84 | 0.10 | 58.5 | 5.90 | ZSM-5, Cordierite, little or no crystalline impurity |
| O | Leached | 170/72 | 49.0$^b$ | 10.3 | 0.98 | 710.5 | 71.34 | ZSM-5, cordierite, little or no |

TABLE 2-continued

| Ex. | Honeycomb | Treatment Conditions (°C./hrs.) | Weight of Coated Silica (g)* | Treatment Solution Composition (in grams) | | | | XRD-Identified Phases |
|---|---|---|---|---|---|---|---|---|
| | | | | NaOH | Alumina (Hydral-710) | H$_2$O | TPA-Br | |
| | | | | | | | | crystalline impurity |

*$^a$200μ
$^b$7μ

EXAMPLE 3

A series of honeycomb substrates were prepared by standard mixing, extruding, and firing techniques from pre-reacted cordierite and active silica (Grace-81 silica gel, used either "as is" having a particle size of 150 , or ball-milled to have a particle size of 7.5μ). In each case, the weights of active silica embedded in the fired honeycomb was 16.7–30.9% by weight of the total honeycomb weight.

The honeycombs were immersed in various treatment solutions to crystallize ZSM-5 zeolite. For each honeycomb, the crystallization was carried out in a 125-ml teflon cup enclosed in a steel bomb at 170° C. and autogenous pressure for 72–75 hours. All treatment solutions for ZSM-growth contained TPA-Br. (Attempts to crystallize Y-type and mordenite zeolite in the absence of templating agent in the experiment resulted in no substantial zeolite growth.) After crystallization, the honeycomb were washed with hot distilled water, dried at 100° C. for 24 hours, and characterized by XRD. Table 3 gives details of the experiments.

TABLE 3

| Ex | Honeycomb firing conditions (°C./hrs.) | Silica content of Honeycomb (g/wt. %)* | Treatment conditions (°C./hrs.) | Treatment Solution Composition (in grams) | | | | XRD-Identified Phases |
|---|---|---|---|---|---|---|---|---|
| | | | | NaOH | TPA-Br | H$_2$O | Alumina (Hydral-710) | |
| A | 500/6 | 5/30.5%$^a$ | 170/70 | 1.05 | 7.38 | 73.07 | 0.00 | ZSM-5, cordierite |
| B | 500/6 | 5/44.4%$^a$ | 170/70 | 1.05 | 7.38 | 73.0 | 0.10 | ZSM-5, cordierite |
| C | 500/6 | 2.9/16.7%$^a$ | 170/72 | 0.59 | 4.13 | 40.9 | 0.00 | ZSM-5, cordierite |
| D | 500/6 | 3.5/25%$^a$ | 170/72 | 0.73 | 5.14 | 50.85 | 0.00 | ZSM-5, cordierite |
| E | 700/6 | 5/30.5%$^a$ | 170/72 | 1.05 | 7.38 | 73.07 | 0.00 | ZSM-5, cordierite |
| F | 650/6 | 3.04/30.87%$^b$ | 170/72 | 0.40 | 2.70 | 26.3 | 0.00 | ZSM-5, cordierite |
| G | 650/6 | 5.13/30.87%$^b$ | 170/72 | 0.87 | 6.14 | 60.70 | 0.00 | ZSM-5, cordierite |
| H | 650/6 | 4.08/26%$^b$ | 170/75 | 0.85 | 6.03 | 59.6 | 0.00 | ZSM-5, cordierite |
| I | 650/6 | 3.65/24.2%$^b$ | 170/75 | 0.76 | 5.40 | 53.3 | 0.00 | ZSM-5, cordierite |
| J | 800/6 | 4.36/26%$^b$ | 170/73 | 0.91 | 6.38 | 63.15 | 0.09 | ZSM-5, cordierite |
| K | 800/6 | 4.06/24.2%$^b$ | 170/73 | 0.84 | 5.95 | 58.80 | 0.08 | ZSM-5, cordierite |

*$^a$150μ
$^b$7.5μ

EXAMPLE 4

A series of Celcor ® cordierite honeycomb monoliths were acid-leached as described in Example 1. Coating slurries were prepared by admixing 40 weight parts of silica gel (ball-milled Grace-81), 150 weight parts Silbond H-5 (prehydrolyzed ethyl-orthosilicate) solution, and either 5% by weight, based on the silica weight, of silicalite (pentacil structure) zeolite crystals (S-115, Union Carbide Co.) or 10% by weight, based on silica weight, of mordenite zeolite crystals (LZM-5, Union Carbide Co.). The leached honeycombs were provided with a dried coating of active silica from the coating slurries by the procedure described in Example 2. In each case, the honeycomb had a coating weighing 20–30% of the weight of the uncoated honeycomb.

The coated honeycombs were immersed in various treatment solutions to crystallize either mordenite or silicalite zeolite. For each honeycomb, crystallization was conducted in a 125-ml teflon cup enclosed in a steel bomb at 160°–170° C. and at autogenous pressure. After crystallization, the honeycombs were washed with hot distilled water, dried at 100° C. for 16–24 hours, and the major crystalline phases in the honeycomb identified by XRD. Table 4 gives details of the experiments.

TABLE 4

| Ex | Treatment Condition (°C./hr.) | Silica in coating (g) | Zeolite Seed in coating (g) | Treatment Solution Composition (in grams) | | | | XRD-Identified Phases |
|---|---|---|---|---|---|---|---|---|
| | | | | NaOH | H$_2$O | Alumina Hydral-710 | TPA-Br | |
| A | 165/72 | 4.36 | 0.27 (S-115) | 0.95 | 66 | 0.09 | 6.6 | Silicalite, cordierite |
| B | 165/72 | 4.93 | 0.27 (S-115) | 0.95 | 66 | 0.09 | — | Silicalite, cordierite |
| C | 165/72 | 4.36 | 0.24 (S-115) | 0.95 | 66 | 0.09 | — | Silicalite, cordierite |
| D | 160/50 | 4.93 | 0.57 (Mord.) | 1.5 | 52 | 0.86 | — | Mordenite, cordierite |
| E | 160/50 | 4.93 | 0.57 (Mord.) | 1.5 | 52 | 0.86 | — | Mordenite, cordierite |

EXAMPLE 5

A series of honeycomb substrates were prepared by standard mixing, extruding, and firing techniques from fired (amorphous) silica, active silica (Grace-81 silica gel, ball-milled to 8N average particle size), silicon resin (Dow-Corning QC-2230 series, 46% by weight SiO$_2$), and either silicalite (pentacil structure) zeolite seed

| Honeycomb Specimen | Fused Quartz | Active Silica | Silicon Resin | Mordenite Seed | Silicalite Seed |
|---|---|---|---|---|---|
| 1 | 68.0 | 18.8 | 8.2 | — | 5.0 |
| 2 | 64.4 | 17.9 | 7.7 | — | 10.0 |
| 3 | 64.4 | 17.9 | 7.7 | 10.0 | — |
| 4 | 77.2 | 5.1 | 7.7 | 10.0 | — |

The honeycombs were immersed in various treatment solutions to crystallize mordenite or ZSM-5 zeolite. For each honeycomb, the crystallization was conducted in a 125-ml teflon cup enclosed in a steel bomb at 160°–170° C. and at autogenous pressure. After crystallization, the honeycombs were washed with hot distilled water, dried at 100° C. for 24 hours, and characterized by XRD. Details of the experimental procedures are given in Table 5.

TABLE 5

| Ex | Honeycomb Specimen | Honeycomb Firing Conditions (°C./hrs.) | Active Silica in Honeycomb (g) | Zeolite Seed in Honeycomb (g) | Treatment Conditions (°C./hrs) | NaOH | Alumina (Hydral-710) | $H_2O$ | XRD-Identified Phases |
|---|---|---|---|---|---|---|---|---|---|
| A | 3 | 750/6 | 4.2 | 1.64 | 160/50 | 1.28 | 0.73 | 44 | Mordenite + amorphous silica; small amount of crystalline impurity |
| B | 3 | 750/6 | 3.15 | 1.23 | 160/50 | 0.96 | 0.55 | 44 | Mordenite + amorphous silica; small amount of crystalline impurity |
| C | 4 | 750/6 | 2.33 | 1.82 | 160/50 | 0.71 | 0.40 | 45 | Amorphous silica + mordenite; little or no crystalline impurity |
| D | 4 | 750/6 | 1.67 | 1.30 | 160/50 | 0.51 | 0.30 | 45 | Mordenite + amorphous silica; little or no crystalline impurity |
| E | 3 | 500/6 | 4.2 | 1.64 | 160/50 | 0.96 | 0.55 | 45 | Mordenite + amorphous silica; little or no crystalline impurity |
| F | 3 | 500/6 | 3.15 | 1.23 | 160/50 | 0.96 | 0.55 | 45 | Mordenite + amorphous silica; little or no crystalline impurity |
| G | 4 | 500/6 | 2.33 | 1.82 | 160/50 | 0.71 | 0.40 | 45 | Mordenite + amorphous silica; little or no crystalline impurity |
| H | 4 | 500/6 | 1.67 | 1.30 | 160/50 | 0.51 | 0.30 | 45 | amorphous silica + mordenite; little or no crystalline impurity |
| I | 3 | 750/6 | 4.20 | 1.64 | 125/50 | 1.28 | 0.73 | 44 | amorphous silica + mordenite; little or no crystalline impurity |
| J | 3 | 750/6 | 3.15 | 1.23 | 125/50 | 0.96 | 0.55 | 44 | amorphous silica + mordenite; little or no crystalline impurity |
| K | 4 | 750/6 | 2.33 | 1.82 | 125/50 | 0.71 | 0.40 | 45 | amorphous silica + mordenite |
| L | 4 | 750/6 | 1.67 | 1.30 | 125/50 | 0.51 | 0.30 | 45 | amorphous silica + mordenite |
|   |   |   |   |   |   | Treatment Solution Composition (grams) | | | |
| M | 3 | 750/6 | 4.2 | 1.64 | 160/90 | 1.28 | 0.00 | 44 | Mordenite + amorphous silica + |
| N | 3 | 750/6 | 3.15 | 1.23 | 160/90 | 0.96 | 0.00 | 44 | Mordenite + amorphous silica |
| O | 1 | 900/6 | 4.35 | 0.80 | 160/54 | 0.95 | 0.09 | 66 | Silicalite + amorphous silica; some crystalline impurity |
| P | 1 | 900/6 | 3.03 | 0.56 | 160/54 | 0.70 | 0.06 | 48 | Silicalite + amorphous silica; some crystalline impurity |
| Q | 2 | 900/6 | 4.17 | 1.63 | 160/50 | 0.95 | 0.09 | 66 | Silicalite + amorphous silica; some crystalline impurity |
| R | 2 | 900/6 | 2.94 | 1.15 | 160/50 | 0.70 | 0.06 | 48 | Silicalite + amorphous silica; some crystalline impurity |
| S | 1 | 500/6 | 4.52 | 0.83 | 160/50 | 0.95 | 0.09 | 66 | Silicalite + amorphous silica; some crystalline impurity |
| T | 1 | 500/6 | 3.18 | 0.58 | 160/50 | 0.70 | 0.06 | 48 | Silicalite + amorphous silica; some crystalline impurity |
| U | 2 | 750/6 | 4.24 | 1.66 | 160/72 | 0.95 | 0.09 | 66 | Silicalite + amorphous silica; some crystalline impurity |
| V | 2 | 750/6 | 2.90 | 1.15 | 160/72 | 0.70 | 0.06 | 48 | Silicalite +amorphous silica; some crystalline impurity |
| W | 1 | 750/6 | 4.39 | 0.80 | 160/72 | 0.95 | 0.09 | 66 | Silicalite + amorphous silica; some crystalline |

TABLE 5-continued

| Ex | Honeycomb Specimen | Honeycomb Firing Conditions (°C./hrs.) | Active Silica in Honeycomb (g) | Zeolite Seed in Honeycomb (g) | Treatment Conditions (°C./hrs) | NaOH | Alumina (Hydral-710) | $H_2O$ | XRD-Identified Phases |
|---|---|---|---|---|---|---|---|---|---|
| X | 1 | 750/6 | 2.99 | 0.55 | 160/72 | 0.70 | 0.06 | 48 | Silicalite +amorphous silica; some crystalline impurity |
| Y | 1 | 1000/6 | 4.24 | 0.78 | 160/50 | 0.95 | 0.09 | 66 | Silicalite + amorphous silica; some crystalline impurity |
| Z | 1 | 1000/6 | 2.91 | 0.53 | 160/50 | 0.70 | 0.06 | 48 | Silicalite + amorphous silica; some crystalline impurity |
| AA | 2 | 1000/6 | 4.02 | 1.57 | 160/50 | 0.95 | 0.09 | 66 | Silicalite + amorphous silica; some crystalline impurity |
| BB | 2 | 1000/6 | 2.85 | 1.11 | 160/50 | 0.70 | 0.06 | 48 | Silicalite + amorphous silica; some crystalline impurity |
| CC | 1 | 750/6 | 2.81 | 0.52 | 95/72 | 0.70 | 0.06 | 48 | Silicalite + amorphous silica; some crystalline |

What is claimed is:

1. A method of crystallizing a zeolite on the surfaces of a monolithic ceramic substrate, comprising
   (a) providing a sintered monolithic substrate having an oxide composition consisting essentially of 45-75% by weight silica, 8-45% by weight alumina, and 7-20% by weight magnesia; and
   (b) hydrothermally treating the substrate with an aqueous solution comprising sodium oxide or sodium hydroxide and alumina at a temperature and for a time sufficient to crystallize a zeolite on the surfaces of said substrate.

2. The method of claim 1 in which the aqueous solution further comprises active silica having a surface area of at least 25 $m^2/g$.

3. The method of claim 2 of crystallizing a X-type zeolite wherein the molar ratios of silica/alumina/sodium oxide/water in the aqueous solution are about 1/0.2–0.5/1.2–1.5/40–60.

4. The method of claim 2 of crystallizing a Y-type zeolite wherein the molar ratios of silica/alumina/sodium oxide/water in the aqueous solution are about 1/0.04–0.14/0.4–0.6/16–24.

5. The method of claim 2 of crystallizing a mordenite zeolite wherein the molar ratios of silica/alumina/sodium oxide/water in the aqueous solution are about 1/0.04–0.09/0.11–0.15/20–25.

6. The method of claim 2 of crystallizing a ZSM-5 zeolite in which the molar ratios of silica/alumina/sodium oxide/water in the aqueous solution are about 1/0–0.04/0.2–0.75/16–20.

7. The method of claim 6 wherein the aqueous solution further comprises an organic templating agent.

8. A method of crystallizing a zeolite on the surfaces of a monolithic ceramic substrate, comprising
   (a) providing a substantially sintered monolithic substrate of cordierite, a glass, or a glass-ceramic;
   (b) contacting said substrate with a strong mineral acid for a time sufficient to produce a weight loss of about 4–32% in the substrate; and
   (c) hydrothermally treating the substrate with an aqueous solution comprising sodium oxide or sodium hydroxide and alumina at a temperature and for a time sufficient to crystallize a zeolite on the surfaces of said substrate.

9. The method of claim 8 in which the monolithic substrate consists essentially of cordierite and in which the aqueous solution further comprises active silica having a surface area of at least 25 $m^2/g$.

10. The method of claim 9 of crystallizing a X-type zeolite wherein the molar ratios of silica/alumina/sodium oxide/water in the aqueous solution are about 1/0.2–0.5/1.2–1.5/40–60.

11. The method of claim 9 of crystallizing a Y-type zeolite wherein the molar ratios of silica/alumina/sodium oxide/water in the aqueous solution are about 1/0.04–0.14/0.4–0.6/16–24.

12. The method of claim 9 of crystallizing a mordenite zeolite wherein the molar ratios of silica/alumina/sodium oxide/water in the aqueous solution are about 1/0.04–0.09/0.11–0.15/20–25.

13. The method of claim 9 of crystallizing a ZSM-5 zeolite in which the molar ratios of silica/alumina/sodium oxide/water in the aqueous solution are about 1/0–0.04/0.2–0.75/16–20.

14. The method of claim 13 wherein the aqueous solution further comprises an organic templating agent.

15. The method of claim 8 further comprising the step prior to said contacting step (b), of providing a dried coating of active silica on said substrate wherein the weight of the coating is 1–45% of the weight of the coated substrate.

16. A method of crystallizing a zeolite on the surface of a monolithic ceramic substrate, comprising
   (a) providing a substantially sintered monolithic substrate comprising a porous ceramic matrix material and 10–40% by weight, based on the total substrate weight, of active silica dispersed throughout and embedded within the matrix material; and
   (b) hydrothermally treating said substrate with an aqueous solution comprising sodium oxide and optionally alumina at a temperature and for a time sufficient to crystallize a zeolite on the surfaces of said substrate.

17. The method of claim 16 wherein said porous ceramic material consists essentially of cordierite, mullite, zircon, quartz, spinel, feldspar, titania, fused silica, alumina, zirconia, lithium aluminosilicate, kaolin clay, metal, silicon carbide, silicon nitride, or mixtures thereof.

18. The method of claim 17 wherein the monolithic substrate consists essentially of cordierite, fused silica, mullite, zirconia, or quartz and wherein said active silica has a surface area of at least about 25 $m^2/g$.

19. The method of claim 18 of crystallizing an X-type zeolite wherein the molar ratios of alumina/sodium oxide/water in the aqueous solution are about 0.2–0.5/1.2–1.5/40–60 for each mole of active silica in said monolithic substrate.

20. The method of claim 19 wherein said monolithic substrate further comprises pre-formed crystals of X-type zeolite dispersed throughout and embedded within the matrix material.

21. The method of claim 18 of crystallizing a Y-type zeolite wherein the molar ratios of alumina/sodium oxide/water in the aqueous solution are about 0.04–0.14/0.4–0.6/16–24 for each mole of active silica in said monolithic substrate.

22. The method of claim 21 wherein said monolithic substrate further comprises pre-formed crystals of Y-type zeolite dispersed throughout and embedded within the matrix material.

23. The method of claim 18 of crystallizing a mordenite zeolite wherein the molar ratios of alumina/sodium oxide/water in the aqueous solution are about 0.04–0.09/0.11–0.15/20–25 for each mole of active silica in said monolithic substrate.

24. The method of claim 23 wherein said monolithic substrate further comprises pre-formed crystals of mordenite zeolite dispersed throughout and embedded within the matrix material.

25. The method of claim 18 of crystallizing a ZSM-5 zeolite wherein the molar ratios of alumina/sodium oxide/water in said aqueous solution are about 0–0.04/0.2–0.75/16–20 for each mole of active silica in said monolithic substrate.

26. The method of claim 25 wherein said aqueous solution further comprises an organic templating agent.

27. The method of claim 25 wherein said monolithic substrate further comprises pre-formed crystals of silicalite zeolite dispersed throughout and embedded within the matrix material.

28. The method of claim 16, 20, 22, 24, or 27 further comprising the step, prior to said treating step (b), of providing a dried coating of active silica on said substrate wherein the weight of the coating is 1–45% of the weight of the coated substrate.

29. The method of claim 16, 20, 22, 24, or 27 further comprising the step, prior to said treating step (b), of contacting said substrate with a strong mineral acid for a time sufficient to produce a weight loss of about 4–32% in the substrate.

* * * * *